United States Patent
Niven et al.

(10) Patent No.: US 8,845,940 B2
(45) Date of Patent: Sep. 30, 2014

(54) CARBON DIOXIDE TREATMENT OF CONCRETE UPSTREAM FROM PRODUCT MOLD

(71) Applicant: CarbonCure Technologies Inc., Halifax (CA)

(72) Inventors: Robert Niven, Ketch Harbour (CA); George Sean Monkman, Montreal (CA); Dean Forgeron, Halifax (CA)

(73) Assignee: Carboncure Technologies Inc., Halifax, Nova Scotia (CA)

( * ) Notice: Subject to any disclaimer, the term of this patent is extended or adjusted under 35 U.S.C. 154(b) by 0 days.

(21) Appl. No.: 13/660,447

(22) Filed: Oct. 25, 2012

(65) Prior Publication Data
US 2014/0116295 A1   May 1, 2014

(51) Int. Cl.
| | |
|---|---|
| C04B 40/00 | (2006.01) |
| B28B 3/00 | (2006.01) |
| H05B 6/00 | (2006.01) |
| B28B 3/06 | (2006.01) |
| B28B 5/00 | (2006.01) |
| C04B 7/00 | (2006.01) |
| C04B 7/34 | (2006.01) |
| C04B 28/00 | (2006.01) |
| C04B 32/00 | (2006.01) |
| B28B 1/00 | (2006.01) |
| B28B 1/08 | (2006.01) |
| B28B 17/00 | (2006.01) |
| B29C 31/04 | (2006.01) |
| E04G 21/06 | (2006.01) |
| A21C 3/02 | (2006.01) |
| B29B 13/00 | (2006.01) |
| B29C 53/32 | (2006.01) |
| B29C 69/00 | (2006.01) |

(52) U.S. Cl.
USPC .......... 264/82; 264/333; 264/426; 264/297.9; 106/638; 425/64; 425/317

(58) Field of Classification Search
USPC .............. 29/401.1; 425/63, 64, 317; 106/638; 264/82, 333, 426, 297.9
See application file for complete search history.

(56) References Cited

U.S. PATENT DOCUMENTS

| | | | |
|---|---|---|---|
| 1,932,150 | A | 10/1933 | Tada |
| 2,496,895 | A | 2/1950 | Staley |

(Continued)

FOREIGN PATENT DOCUMENTS

| | | | |
|---|---|---|---|
| CA | 0970935 | A | 7/1975 |
| CA | 1185078 | A | 7/1985 |

(Continued)

OTHER PUBLICATIONS

"Fluid Hole and Size". Newton: Ask a Scientist. Retrieved from http://www.newton.dep.anl.gov/askasci/eng99/eng99365.htm.*

(Continued)

*Primary Examiner* — Kaj K Olsen
*Assistant Examiner* — Karam Hijji
(74) *Attorney, Agent, or Firm* — Wilson Sonsini Goodrich & Rosati

(57) ABSTRACT

Fresh concrete is treated with carbon dioxide prior to delivery to a product mold for forming concrete products. Carbon dioxide gas is directed through a manifold, which may be coupled to a feedbox or a hopper, upstream from the product mold. Treating the fresh concrete with the carbon dioxide gas while it is in a loose state prior to placement in the product mold may generally promote uniform and enhanced carbon dioxide uptake.

15 Claims, 13 Drawing Sheets

(56) References Cited

U.S. PATENT DOCUMENTS

| | | | |
|---|---|---|---|
| 3,356,779 A | 12/1967 | Schulze | |
| 3,358,342 A | 12/1967 | Spence | |
| 3,468,993 A | 9/1969 | Bierlich | |
| 3,492,385 A | 1/1970 | Simunic | |
| 4,069,063 A | 1/1978 | Ball | |
| 4,093,690 A | 6/1978 | Murray | |
| 4,117,060 A | 9/1978 | Murray | |
| 4,266,921 A | 5/1981 | Murray | |
| 4,350,567 A | 9/1982 | Moorehead et al. | |
| 4,362,679 A | 12/1982 | Malinowski | |
| 4,427,610 A | 1/1984 | Murray | |
| 4,436,498 A | 3/1984 | Murray | |
| 4,588,299 A | 5/1986 | Brown et al. | |
| 4,746,481 A | 5/1988 | Schmidt | |
| 4,772,439 A | 9/1988 | Trevino-Gonzalez | |
| 4,917,587 A * | 4/1990 | Alpar et al. | 425/64 |
| 4,944,595 A | 7/1990 | Hodson | |
| 5,051,217 A | 9/1991 | Alpar et al. | |
| 5,232,496 A | 8/1993 | Jennings et al. | |
| 5,257,464 A | 11/1993 | Trevino-Gonzales | |
| 5,518,540 A | 5/1996 | Jones, Jr. | |
| 5,650,562 A | 7/1997 | Jones, Jr. | |
| 5,669,968 A | 9/1997 | Kobori et al. | |
| 5,676,905 A | 10/1997 | Andersen et al. | |
| 5,690,729 A | 11/1997 | Jones, Jr. | |
| 5,744,078 A | 4/1998 | Soroushian et al. | |
| 5,800,752 A | 9/1998 | Charlebois | |
| 5,882,190 A * | 3/1999 | Doumet | 432/106 |
| 5,935,317 A | 8/1999 | Soroushian et al. | |
| 6,264,736 B1 | 7/2001 | Knopf et al. | |
| 6,387,174 B2 | 5/2002 | Knopf et al. | |
| 7,390,444 B2 | 6/2008 | Ramme et al. | |
| 7,771,684 B2 | 8/2010 | Constantz et al. | |
| 7,815,880 B2 | 10/2010 | Constantz et al. | |
| 7,879,146 B2 | 2/2011 | Raki et al. | |
| 7,922,809 B1 | 4/2011 | Constantz et al. | |
| 8,006,446 B2 | 8/2011 | Constantz et al. | |
| 8,114,367 B2 | 2/2012 | Riman et al. | |
| 2008/0202389 A1 | 8/2008 | Hojaji et al. | |
| 2008/0245274 A1 | 10/2008 | Ramme | |
| 2011/0165400 A1 | 7/2011 | Quaghebeur et al. | |
| 2011/0289901 A1 | 12/2011 | Estes et al. | |
| 2012/0238006 A1 | 9/2012 | Gartner et al. | |

FOREIGN PATENT DOCUMENTS

| | | |
|---|---|---|
| DE | 3139107 A1 | 4/1983 |
| DE | 19506411 A1 | 8/1996 |
| EP | 0218189 A2 | 4/1987 |
| EP | 0151164 B1 | 5/1988 |
| EP | 0218189 A3 | 5/1988 |
| EP | 0629597 A1 | 12/1994 |
| FR | 1259819 A | 4/1961 |
| FR | 2121975 A | 8/1972 |
| FR | 2503135 A | 10/1982 |
| FR | 2503135 A1 | 10/1982 |
| FR | 2513932 A | 4/1983 |
| FR | 2513932 A1 | 4/1983 |
| FR | 2735804 A | 12/1996 |
| FR | 2735804 A1 | 12/1996 |
| GB | 217791 A | 6/1924 |
| GB | 574724 A | 1/1946 |
| GB | 644615 A | 10/1950 |
| GB | 1199069 A | 7/1970 |
| GB | 1337014 A | 11/1973 |
| GB | 1460284 A | 12/1976 |
| GB | 2106868 A | 4/1983 |
| GB | 2106886 A | 4/1983 |
| GB | 2192392 A | 1/1988 |
| GB | 2300631 A | 11/1996 |
| GB | 2302090 A | 1/1997 |
| JP | 2-18368 A | 1/1990 |
| JP | 02018368 A | 1/1990 |
| JP | 6-144944 A | 5/1994 |
| JP | 06144944 A | 5/1994 |
| JP | 6263562 A | 9/1994 |
| JP | 7-48186 A | 2/1995 |
| JP | 07048186 A | 2/1995 |
| JP | 10-194798 A | 7/1998 |
| JP | 10194798 A | 7/1998 |
| JP | 11303398 A | 11/1999 |
| JP | 2000-203964 A | 7/2000 |
| JP | 2000203964 A | 7/2000 |
| JP | 2000-247711 A | 9/2000 |
| JP | 2000247711 A | 9/2000 |
| JP | 2000-281467 A | 10/2000 |
| JP | 2002-12480 A | 1/2002 |
| JP | 2002012480 A | 1/2002 |
| JP | 2002-127122 A | 5/2002 |
| JP | 2002127122 A | 5/2002 |
| JP | 2007-326881 | 6/2009 |
| SE | 8002613 | 3/1982 |
| SE | 8002613 B | 3/1982 |
| SE | 451067 B | 8/1987 |
| WO | 85/00587 A1 | 2/1985 |
| WO | WO 94/27797 A1 | 12/1994 |
| WO | 01/90020 A2 | 11/2001 |
| WO | WO 2004/074733 A1 | 9/2004 |
| WO | WO 2006040503 A1 * | 4/2006 |
| WO | 2009/078430 A1 | 6/2009 |
| WO | 2009/132692 A1 | 11/2009 |
| WO | 2012/079173 A1 | 6/2012 |

OTHER PUBLICATIONS

Mehta, Rupal. "Concrete Carbonation". Materials World Magazine. Oct. 1, 2008 [Retrieved on Jul. 13, 2013] Retrieved from http://www.iom3.org/news/concrete-carbonation.*

"Technology Roadmap: Cement". International Energy Agency. Dec. 2009 [Retrieved on Jul. 13, 2013]. Retrieved from http://www.iea.org/publications/freepublications/publication/name,3861,en.html.*

International search report and written opinion dated Mar. 6, 2012 for PCT Application No. CA2011/050774.

Kashef-Haghighi, et al. Accelerated Concrete Carbonation, a CO2 Sequestration Technology. 8th World Congress of Chemical Engineering WCCE8. Aug. 24, 2009.

Kashef-Haghighi, et al. CO2 sequestration in concrete through accelerated carbonation curing in a flow-through reactor. Ind. Eng. Chem. Res. 2010; 49:1143-1149.

Niven, et al. Carbon Dioxide Uptake Rate and Extent during Accelerated Curing of Concrete. International Congress on the Chemistry of Cement 2007. ICCC 2007.

Niven. Physiochemical investigation of CO2 accelerated concrete curing as a greenhosue gas mitigation technology. These from the Department of Civil Engineering and Applied Mechanics. McGill University, Montreal, Canada. Oct. 2006.

Abanades, et al. Conversion limits in the reaction of CO2 with lime. Energy and Fuels. 2003; 17(2):308-315.

Bertos, et al. A review of accelerated carbonation technology in the treatment of cement-based materials and sequestration of CO2. J Hazard Mater. Aug. 30, 2004;112(3):193-205.

Bhatia, et al. Effect of the Product Layer on the kinetics of the CO2-lime reaction. AIChE Journal. 1983; 29(1):79-86.

Chang, et al. The experimental investigation of concrete carbonation depth. Cement and Concrete Research. 2006; 36(9):1760-1767.

Chen, et al. On the kinetics of Portland cement hydration in the presence of selected chemical admixtures. Advances in Cement Research. 1993; 5(17):9-13.

Dewaele, et al. Permeability and porosity changes associated with cement grout carbonation. Cement and Concrete Research. 1991; 21(4):441-454.

Fernandez-Bertos, et al. A review of accelerated carbonation technology in the treatment of cement-based materials and sequestration of CO2. Journal of Hazardous Materials B112. 2004; 193-205.

Freedman, S. Carbonation Treatment of Concrete Masonry Units. Modern Concrete. 1969; 33(5):33-6.

Goodbrake, et al. Reaction of Hydraulic Calcium Silicates with Carbon Dioxide and Water. Journal of the American Ceramic Society. 1979; 62(9-10):488-491.

(56) References Cited

OTHER PUBLICATIONS

Goto, et al. Calcium Silicate Carbonation Products. Journal of the American Ceramic Society. 1995; 78(11):2867-2872.
Huijgen, et al. Mineral CO2 sequestration by steel slag carbonation. Environmental Science and Technology. 2005; 39(24):9676-9682.
Huntzinger, et al. Carbon dioxide sequestration in cement kiln dust through mineral carbonation. Environ Sci Technol. Mar. 15, 2009;43(6):1986-92.
Iizuka, et al. Development of a new CO2 sequestration process utilizing the carbonation of waste cement. Industrial & Engineering Chemistry Research. 2004; (43)24:7880-7887.
Lange, et al. Preliminary investigation into the effects of carbonation on cement-solidified hazardous wastes. Environmental Science and Technology. 1996; 30(1):25-30.
Logan, C. Carbon dioxide absorption and durability of carbonation cured cement and concrete compacts. Thesis. Department of Civil Engineering, McGill University. Montreal, QC, Canada. 2006.
Monkman, et al. Assessing the Carbonation Behavior of Cementitious Materials. J. Mater. Civ. Eng. 2006; 18(6), 768-776.
Monkman, et al. Carbonated Ladle Slag Fines for Carbon Uptake and Sand Substitute. Journal of Materials in Civil Engineering. Nov. 2009;657-665.
Monkman, et al. Carbonation Curing of Slag-Cement Concrete for Binding CO2 and Improving Performance. Journal of Materials in Civil Engineering. Apr. 2010; 296-304.
Monkman, et al. Integration of carbon sequestration into curing process of precast concrete. Can. J. Civ. Eng. 2010; 37:302-310.
Monkman, S. Maximizing carbon uptake and performance gain in slag-containing concretes through early carbonation. Thesis. Department of Civil Engineering and Applied Mechanics, McGill University. Montreal, QC, Canada. 2008.
Niven. Industrial pilot study examining the application of precast concrete carbonation curing. Cardon Sense Solutions Inc. Halifax, Canada. ACEME 2008.
Papadakis, et al. A reaction engineering approach to the problem of concrete carbonation. AIChE Journal. 1989; 35(10):1639-1650.
Papadakis, et al. Fundamental Modeling and Experimental Investigation of Concrete Carbonation. ACI Materials Journal. 1991; 88(4):363-373.
Reardon, et al. High pressure carbonation of cementitious grout. Cement and Concrete Research. 1989; 19(3):385-399.
Shao, et al. A new CO2 sequestration process via concrete products production. Department of civil engineering. McGill University, Montreal, Canada. 2007.
Shao, et al. CO2 sequestration using calcium-silicate concrete. Canadian Journal of Civil Engineering. 2006;(33)6:776-784.
Shao, et al. Market analysis of CO2 sequestration in concrete building products. Second International Conference on Sustainable Construction Materials and Technologies. Jun. 28-30, 2010.
Shao, et al. Recycling carbon dioxide into concrete: a feasibility study. Concrete Sustainability Conference. 2010.
Shi, et al. Studies on some factors affecting CO2 curing of lightweight concrete products. Resources, Conservation and Recycling. 2008; (52)8-9:1087-1092.
Shideler, J. Investigation of the moisture-volume stability of concrete masonry units. Portland Cement Association. 1955. (D3).
Shih, et al. Kinetics of the reaction of Ca(OH)2 with CO2 at low temperature. Industrial and Engineering Chemistry Research. 1999; 38(4):1316-1322.
Steinour, H. Some effects of carbon dioxide on mortars and concrete-discussion. Journal of the American Concrete Institute. 1959; 30:905-907.
Toennies, et al. Artificial carbonation of concrete masonry units. American Concrete Institute Journal. 1960; 31(8):737-755.
Van Balen, K. Carbonation reaction of lime, kinetics at ambient temperature. Cement and Concrete Research. 2005; 35(4):647-657.
Venhuis, et al. Vacuum method for carbonation of cementitious wasteforms. Environ Sci Technol. Oct. 15, 2001;35(20):4120-5.
Weber, et al. Find carbon dioxide gas under pressure an efficient curing agent for cast stone. Concrete. Jul. 1941; 33-34.
Young, et al. Accelerated Curing of Compacted Calcium Silicate Mortars on Exposure to CO2. Journal of the American Ceramic Society.. 1974; 57(9):394-397.
International search report and written opinion dated Jul. 18, 2013 for PCT Application No. CA2013/050190.
Preliminary Amendment dated Nov. 1, 2013 for U.S. Appl. No. 13/994,681.
Tri-Cast literature, Besser Company, Sioux City, Iowa, USA, Oct. 18, 2010.
International search report and written opinion dated Jul. 18, 2013 for PCT Application No. CA2011/050190.

* cited by examiner

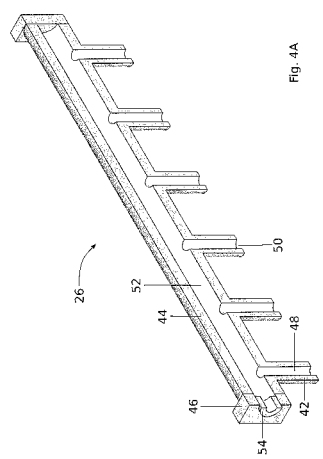

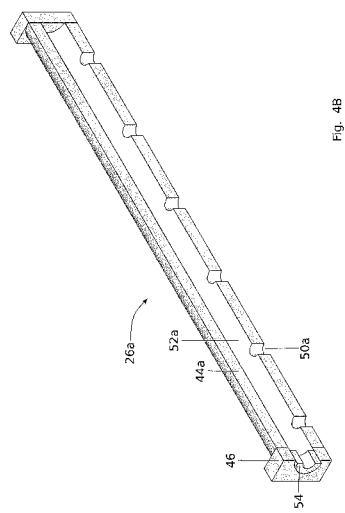

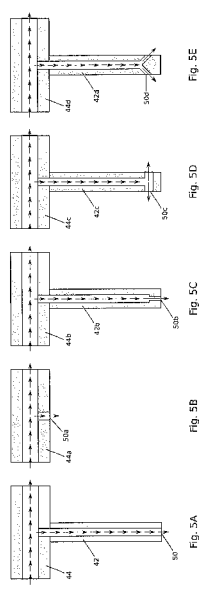

CARBON DIOXIDE TREATMENT OF CONCRETE UPSTREAM FROM PRODUCT MOLD

TECHNICAL FIELD

The present disclosure relates to methods of and apparatuses for making concrete products, for reducing the greenhouse gas emissions associated with making concrete products, and for sequestering carbon dioxide.

BACKGROUND

The following paragraphs are not an admission that anything discussed in them is prior art or part of the knowledge of persons skilled in the art.

U.S. Pat. No. 4,117,060 (Murray) describes a method and apparatus for the manufacture of products of concrete or like construction, in which a mixture of calcareous cementitious binder substance, such as cement, an aggregate, a vinyl acetate-dibutyl maleate copolymer, and an amount of water sufficient to make a relatively dry mix is compressed into the desired configuration in a mold, and with the mixture being exposed to carbon dioxide gas in the mold, prior to the compression taking place, such that the carbon dioxide gas reacts with the ingredients to provide a hardened product in an accelerated state of cure having excellent physical properties.

U.S. Pat. No. 4,362,679 (Malinowski) describes a method of casting different types of concrete products without the need of using a curing chamber or an autoclave subsequent to mixing. The concrete is casted and externally and/or internally subjected to a vacuum treatment to have it de-watered and compacted. Then carbon-dioxide gas is supplied to the mass while maintaining a sub- or under-pressure in a manner such that the gas diffuses into the capillaries formed in the concrete mass, to quickly harden the mass.

U.S. Pat. No. 5,935,317 (Soroushian et al.) describes a $CO_2$ pre-curing period used prior to accelerated (steam or high-pressure steam) curing of cement and concrete products in order to: prepare the products to withstand the high temperature and vapor pressure in the accelerated curing environment without microcracking and damage; and incorporate the advantages of carbonation reactions in terms of dimensional stability, chemical stability, increased strength and hardness, and improved abrasion resistance into cement and concrete products without substantially modifying the conventional procedures of accelerated curing.

U.S. Pat. No. 7,390,444 (Ramme et al.) describes a process for sequestering carbon dioxide from the flue gas emitted from a combustion chamber. In the process, a foam including a foaming agent and the flue gas is formed, and the foam is added to a mixture including a cementitious material (e.g., fly ash) and water to form a foamed mixture. Thereafter, the foamed mixture is allowed to set, preferably to a controlled low-strength material having a compressive strength of 1200 psi or less. The carbon dioxide in the flue gas and waste heat reacts with hydration products in the controlled low-strength material to increase strength. In this process, the carbon dioxide is sequestered. The CLSM can be crushed or pelletized to form a lightweight aggregate with properties similar to the naturally occurring mineral, pumice.

U.S. Pat. No. 8,114,367 (Riman et al.) describes a method of sequestering a greenhouse gas, which comprises: (i) providing a solution carrying a first reagent that is capable of reacting with a greenhouse gas; (ii) contacting the solution with a greenhouse gas under conditions that promote a reaction between the at least first reagent and the greenhouse gas to produce at least a first reactant; (iii) providing a porous matrix having interstitial spaces and comprising at least a second reactant; (iv) allowing a solution carrying the at least first reactant to infiltrate at least a substantial portion of the interstitial spaces of the porous matrix under conditions that promote a reaction between the at least first reactant and the at least second reactant to provide at least a first product; and (v) allowing the at least first product to form and fill at least a portion of the interior spaces of the porous matrix, thereby sequestering a greenhouse gas.

International Publication No. WO/2012/079173 (Niven et al.) describes carbon dioxide sequestration in concrete articles. Concrete articles, including blocks, substantially planar products (such as pavers) and hollow products (such as hollow pipes), are formed in a mold while carbon dioxide is injected into the concrete in the mold, through perforations.

INTRODUCTION

The following paragraphs are intended to introduce the reader to the more detailed description that follows and not to define or limit the claimed subject matter.

According to an aspect of the present disclosure, a method of forming concrete products may include: supplying fresh concrete; treating the fresh concrete with carbon dioxide gas to form treated concrete; and subsequent to the step of treating, delivering the treated concrete to a product mold adapted to form the concrete products.

According to an aspect of the present disclosure, an apparatus for forming concrete products may include: a product mold adapted to form the concrete products; a component upstream of the product mold, and adapted to treat fresh concrete with carbon dioxide gas to form treated concrete, and deliver the treated concrete directly or indirectly to the product mold; and a gas delivery system connected to the component and adapted to control distribution of the carbon dioxide gas through the component.

According to an aspect of the present disclosure, a process of accelerating the curing of concrete and sequestering carbon dioxide in the concrete may include: supplying fresh concrete; directing a plurality of flows of carbon dioxide-containing gas under pressure into the fresh concrete at a respective plurality of locations, to form treated concrete; and subsequent to the step of directing, delivering the treated concrete to a product mold.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings:

FIGS. 4A and 4B are cutaway detail views of gas manifolds;

FIGS. 5A and 5B are cross section views of portions of the gas manifolds of FIGS. 4A and 4B, respectively;

FIGS. 5C to 5E are cross section views of portions of other gas manifolds;

DETAILED DESCRIPTION

Various apparatuses or methods are described below to provide an example of an embodiment of each claimed invention. No example described below limits any claimed invention and any claimed invention may cover apparatuses and methods that differ from those described below. The claimed inventions are not limited to apparatuses and methods having all of the features of any one apparatus or method described below or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, and the applicant(s), inventor(s) and/or owner(s) do not intend to abandon, disclaim or dedicate to the public any such invention by its disclosure in this document.

Figure 1:
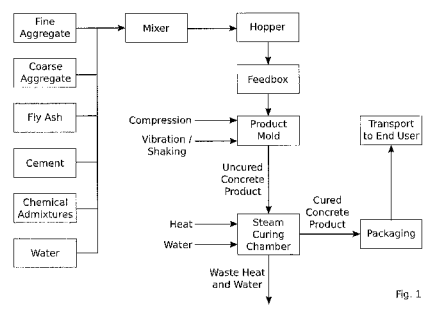
FIG. 1 is a flow chart of a method of manufacturing concrete products.

Referring to FIG. 1, concrete products or concrete articles may be made commercially by forming them in a molding machine and then curing the formed products. In a typical plant, various ingredients are conveyed to a mixer to make fresh concrete. The ingredients may be, for example, fine aggregate, coarse aggregate, fly ash, cement, chemical admixtures, and water. The mixed, fresh concrete is transferred to a hopper located above a product mold.

In each production cycle, an appropriate quantity of concrete is passed from the hopper and into the product mold. The concrete may then be formed and compacted (shaken and compressed) in the product mold into a plurality of products, typically four or more. The products may leave the molding machine on a tray, which is conveyed to a curing area. The products may be cured slowly (7 to 30 days) by exposure to the atmosphere. However, in some commercial operations, the products may be cured rapidly by steam or heat curing. For example, products may be placed in a steam-curing chamber for 8 to 24 hours. The cured products are removed from the curing area, and sent to further processing stations for packaging and transport to the end user.

Some production sequences make use of a feedbox. In each production cycle, an appropriate quantity of concrete is passed from the hopper to the feedbox, which is positioned above the product mold. The material in the feedbox is passed into the product mold as part of a regular cycle. Once the product mold is filled and the product is formed, the cycle will begin anew with new material being placed into the feed box. An agitator grid may be positioned in the feedbox to agitate the concrete as it is dropped from the feedbox into the molding machine. The concrete is then formed and compacted in the product mold, as described previously.

In some cases, the feedbox may be filled with dry cast concrete when the feedbox is in a retracted position. The feedbox may then move from the retracted position to an extended position, in which it is arranged over an open top of the product mold. The dry cast concrete may then be deposited from the feedbox into the product mold, by force of gravity. After depositing the dry cast concrete into the product mold, the feedbox is moved from the extended position to the retracted position. The agitator grid may be positioned to impinge upon the concrete in the feedbox, and assist the concrete in passing uniformly from the feedbox into the product mold.

These processes may be adapted for use with a range of concrete products that are molded in batches, at an industrial scale, for example but not limited to, blocks, pavers, other decorative or structural masonry units, tiles or pipes, etc.

In a process of forming concrete blocks, for example, a pallet may be moved by a conveyor system onto a pallet table or tray that, in turn, may be moved upwardly until the pallet contacts the product mold and forms a bottom for each of the one or more cavities of the product mold. Again, the feedbox, filled with dry cast concrete, may then be moved between the retracted and extended positions causing a feed drawer door of the feedbox to open above a frame of the product mold. With help from the agitator grid, the concrete is dropped into the product mold, where it fills the one or more cavities of the product mold via the open top. The product mold is filled optionally while being vibrated. The block molding machine may include a cutoff bar or blades, which may be fixed-mounted to the feedbox, to scrape or wipe away excess dry cast concrete from the top of the one or more cavities as the feedbox is driven back to the retracted position. The block molding machine may further a stripper assembly having a compaction arm and at least one head shoe, which may be moved into the one or more cavities of the product mold via their open tops to compress the dry cast concrete to a desired psi (pound-force per square inch) rating, while simultaneously vibrating the head shoe, product mold, pallet, and/or pallet table. The form may be raised while the stripper assembly is still in its lowered position leaving the shaped concrete blocks on the table. The compaction arm may then be raised, allowing the formed blocks to be ejected from the molding machine on the table. The cycle is then repeated while the table of formed blocks travels on a conveyor to the steam chamber.

Generally, a production cycle for concrete blocks involves several steps performed in a very short period of time with the molding machine. Each production cycle may make only a small number of blocks, for example 1 to 16 or more, but lasts for only a very short period of time, for example about 5 to 12 seconds. In this way, many blocks may be made in a working shift and transferred to an accelerated curing chamber.

Accelerated curing is used to make the blocks stable relatively quickly, and thereby reduce the total production time until the blocks may be shipped as finished products. Accelerated curing typically involves placing the formed blocks in an enclosure or chamber, and controlling the relative humidity and heat in the chamber for several hours. In cold climates, steam may be used. When the ambient temperature is adequate, moisture may be added without additional heat. The blocks may sit in the curing chamber for 8-48 hours before they are cured sufficiently for packaging.

The block manufacturing process described above may be energy intensive. For example, energy required for the steam curing may exceed 300 MJ per tonne of blocks. Depending on the source of this energy, the greenhouse gas emissions associated with steam curing may be significant, up to about 10 kg of $CO_2$ per tonne of block. Also, while most blocks may be well formed, in a typical production shift several blocks may be damaged as they are stripped from the form and have to be discarded.

In general, the concepts described herein pertain to methods of and apparatuses for forming concrete products, in which fresh concrete is treated with carbon dioxide gas to form treated concrete. The treated concrete is subsequently delivered to a product mold to form the concrete products.

Treating the concrete to carbon dioxide gas while it is in a loose state prior to placement in the product mold may generally promote uniform and enhanced carbon dioxide uptake. Despite a short relatively exposure time, the inventors have recognized that the carbon dioxide uptake may be a significant portion of the theoretical maximum uptake, which for conventional cement may be approximately half of the mass of the cement in the mixture. Furthermore, the resulting calcium carbonate may be well distributed through the concrete, which may thereby improve the material properties of the formed concrete product.

As described in further detail herein, the carbon dioxide gas may be delivered at least in part while the concrete is being portioned for placement into the product mold. The carbon dioxide gas may be directed at the concrete for a period of time of about 60 seconds or less. The carbon dioxide gas may be delivered at an applied pressure of about 875 kPa above atmospheric pressure, or less. The gas may be delivered at a rate of about 80 liters per minute per liter of the concrete, or less. The delivered gas may be carbon dioxide-rich, e.g., at least about 90% carbon dioxide, and may be derived from a pressurized gas source. The gas may be heated. The gas may include a flue gas, which may be derived from a steam or heat curing process for products formed by the molding machine.

The addition of carbon dioxide may promote an alternate set of chemical reactions in the concrete resulting in different reaction products. In particular, thermodynamically stable calcium carbonate (limestone) solids may be formed preferentially to calcium hydroxide (portlandite) products. The carbon dioxide may be solvated, hydrated and ionized in water in the concrete to produce carbonate ions. These ions may combine with calcium ions from the cement to precipitate calcium carbonate in addition to amorphous calcium silicates. In this way, carbon dioxide may be sequestered in the concrete blocks as a solid mineral. Excess gas, if any, may be vented away from the treated concrete mass. Otherwise, the production cycle of a given concrete product may remain generally unchanged.

The carbonated mineral reaction products may increase the early strength of the concrete. This may allow accelerated curing to be eliminated, or a reduction in time or temperature, or both. The energy consumption or total time, or both, of the concrete product making process may thereby be reduced. If steam curing would otherwise be used, then, depending on how the energy for steam curing is generated, there may be a further reduction in the greenhouse gas emissions associated with making the concrete products. The carbonated products may also exhibit one or more of decreased permeability or water absorption, higher durability, improved early strength, reduced efflorescence, and reduced in service shrinkage. The number of products that are damaged when they are stripped from the mold, conveyed or otherwise processed prior to packaging may also be reduced.

The present teachings may be adapted for use with a range of concrete products that are molded in batches, at an industrial scale, for example but not limited to, blocks, pavers, other decorative or structural masonry units, tiles or pipes, etc.

Figure 2A:
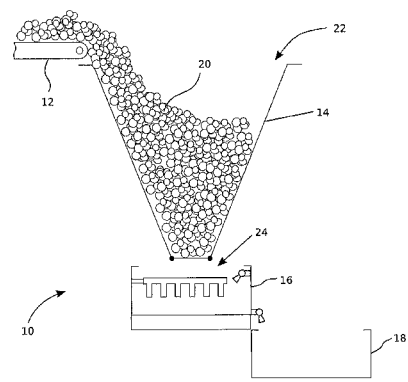
FIGS. 2A to 2E are schematic views of an apparatus including a hopper, a modified feedbox, and a product mold.
Figure 2B:
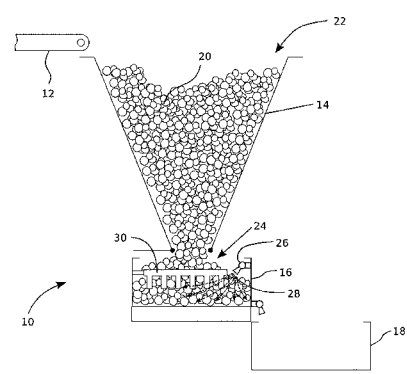

Referring now to FIG. 2A, an apparatus 10 for forming concrete products is illustrated to include a conveyor 12, a hopper 14, a modified feedbox 16 and a product mold 18. The conveyor 12 supplies fresh concrete 20 to an inlet 22 of the hopper 14, either continuously or intermittently. An outlet 24 of the hopper 14 in a closed position maintains the concrete 20 residing in the hopper 14. Referring to FIG. 2B, the outlet 24 of the hopper 14 is moved to an opened position to supply the concrete 20 to the feedbox 16. The feedbox 16 is shown in a retracted position, and includes an agitator grid 30.

In the example illustrated, the feedbox 16 includes a first gas manifold 26. The first gas manifold 26 is positioned to direct a carbon dioxide gas flow 28 at the concrete 20 residing within the feedbox 16. The first gas manifold 26 is shown mounted to an inner surface of a peripheral wall of the feedbox 16. In other examples, the gas manifold may be formed as part of the agitator grid 30. Also, as shown, the carbon dioxide gas flow 28 may be directed by the first gas manifold 26 towards the concrete 20 to impinge an upper surface of the concrete 20. Alternatively, or additionally, the first gas manifold 26 may be positioned so that the carbon dioxide gas flow 28 is injected by the first gas manifold 26 directly into the volume of the concrete 20.

Delivery of carbon dioxide by the first gas manifold 26 may be generally synchronized with the inlet 22 of the hopper 14. For example, the pressurized flow 28 may be provided either once the inlet 22 is opened and the concrete 20 is accumulating in the feedbox 16, or, optionally, the flow 28 may begin immediately prior to opening the inlet 22.

Figure 2C:
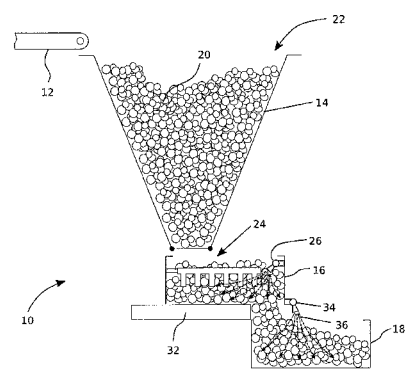
Figure 2D:
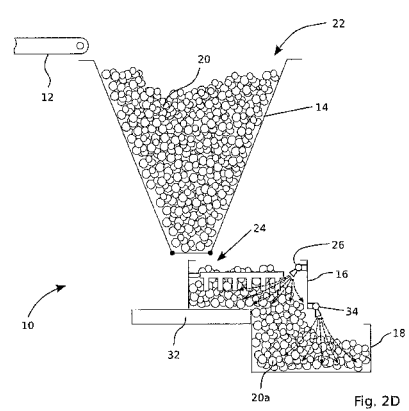
Figure 2E:
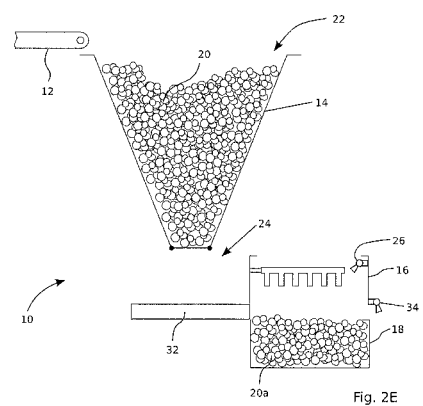

Referring to FIG. 2C, the outlet 24 of the hopper 14 is moved to the closed position to maintain the concrete 20 in the hopper 14. The feedbox 16 is moving towards an extended position, from overtop a base plate 32 to above the product mold 18. A second gas manifold 34 is positioned to direct a carbon dioxide gas flow 36 at a stream of the concrete moving between the feedbox 16 and the product mold 18. Referring to FIG. 2D, the feedbox 16 continues to move towards an extended position, as treated concrete 20a is being delivered to the product mold 18. Finally, referring to FIG. 2E, the feedbox 16 is shown in the extended position, and all of the treated concrete 20a is shown delivered into the product mold 18.

Delivery of carbon dioxide by the second gas manifold 34 may be generally synchronized with movement of the feedbox 16 between the retracted and extended positions. For example, the pressurized flow 36 may be provided either once the feedbox 16 has begun to move over the product mold 18 and the concrete 20 is accumulating in the product mold 18, or, optionally, the flow 36 may begin immediately prior to this while the feedbox 16 remains positioned above the base plate 32.

In the example illustrated in FIGS. 2A to 2E, it should be appreciated that the gas manifolds 26, 34 may be installed as a retrofit to an existing feedbox and product mold configuration.

Figure 3A:
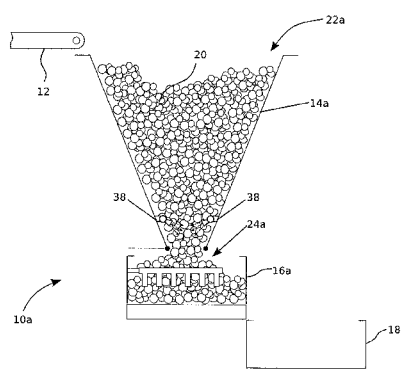
FIGS. 3A and 3B are schematic views of an apparatus including a modified hopper, a feedbox, and a product mold.

Referring now to FIG. 3A, an apparatus 10a for forming concrete products is illustrated to include the conveyor 12, a modified hopper 14a, a feedbox 16a and the product mold 18. The conveyor 12 supplies fresh concrete 20 to an inlet 22a of the hopper 14a, either continuously or intermittently. An outlet 24a of the hopper 14a is shown in an open position to supply the concrete 20 to the feedbox 16a. In the example illustrated, the hopper 14a includes at least one third gas manifold 38. The third gas manifold 38 is shown mounted to an inner surface of a peripheral wall of the hopper 14a, and is positioned to direct at least one flow of carbon dioxide gas at the concrete 20 residing within the hopper 14a.

Figure 3B:
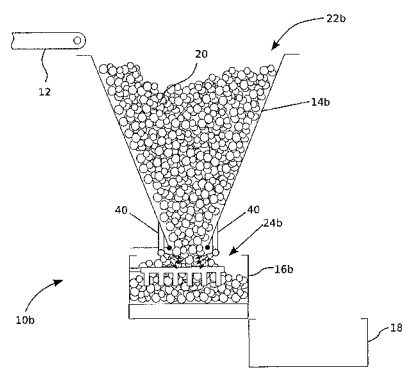

Referring now to FIG. 3B, an apparatus 10b for forming concrete products is illustrated to include the conveyor 12, a modified hopper 14b, a feedbox 16b and the product mold 18. The conveyor 12 supplies fresh concrete 20 to an inlet 22b of the hopper 14b. An outlet 24b of the hopper 14b is shown in an open position to supply the concrete 20 to the feedbox 16b. In the example illustrated, the hopper 14b includes at least one fourth gas manifold 40. The fourth gas manifold 40 is shown mounted to an outer surface of the peripheral wall of the hopper 14a, and is positioned to direct at least one flow of carbon dioxide gas at a stream of the concrete 20 moving out of the outlet 24b of the hopper 14b, and into the feedbox 16a.

In the examples illustrated in FIGS. 3A and 3B, the gas manifolds 38, 40 may be shaped to correspond to the shape of the respective peripheral wall of the hopper 14a, 14b. For example, the gas manifolds 38, 40 may generally square or ring shaped, so as to extend circumferentially about the concrete 20. Furthermore, it should be appreciated that the gas manifolds 38, 40 may be installed as a retrofit to an existing hopper, and may be designed to operate in synchronization with the opening and closing of the respective outlet 24a, 24b.

Referring to FIG. 4A, the first gas manifold 26 is shown to include finger elements 42 and a supporting spine 44. In the example illustrated, each of the finger elements 42 is positioned generally perpendicular relative to the spine 44, and each includes an inward end adjacent to the spine 44, and an outward end spaced apart from the spine 44. The finger elements 42 may be spaced apart at regular intervals across the spine 44, or may be positioned strategically depending on a desired gas flow profile across the spine 44. In some examples, the spine 44 may be generally elongate, and have a length and shape that is appropriate for the mounting location. However, in other examples, the spine may be arc-shaped. The finger elements 42 may have different lengths and different diameters depending on the desired gas flow requirements. The spine 44 is shown affixed to a mounting structure 46 that allows the first gas manifold 26 to be securely mounted.

In the example illustrated, the finger elements 42 and the spine 44 are hollow. Internal gas passages 48 in the finger elements 42 may run through the entirety of the finger elements 42 and terminate in a perforation or aperture 50. The apertures 50 are distributed across the spine 44 for delivering flows of carbon dioxide gas. The configuration of the finger element 42, the spine 44 and the aperture 50 is also shown in FIG. 5A.

With continued reference to FIG. 4A, the apertures 50 may be located at the outward ends of the finger elements 42. The number and size of finger elements 42, and/or the number and size of the apertures 50, may be selected to generally balance a desire to direct carbon dioxide gas across the entirety of the concrete at the location of the gas manifold 26, and a desire to provide some back pressure to gas flow to help equalize the gas flow rate through the apertures 50 in different locations. Furthermore, the size of the apertures 50 may vary, e.g., having a diameter of between 1 mm and 10 mm. The size and number of the aperture 50 may be kept small enough so that a gas flow rate through each of the aperture 50 may be sufficient to push carbon dioxide gas into the concrete mass, if in contact with the concrete, so as to prevent or at least deter liquids or suspensions in the concrete from infiltrating the aperture 50.

A gas passage 52 in the spine 44 may run axially from one end to the opposite end, in fluid communication with each of the gas passages 48 and extending beyond the outermost finger elements 42. At one end of the spine 44, there is an gas inlet fitting 54 for connection to a gas feed conduit (not shown), and which is in fluid communication with the gas passage 52. The size of the gas passage 48 along the length of the spine 44 may vary depending on the relative distance from the gas inlet fitting 54 in order to promote equal gas flow rates into each of the finger elements 42.

Connections between the finger elements 42 and the spine 44 may be welded or threaded. A threaded connection may allow the finger elements 42 to be changed depending on the application. The connection may also be a quick connect setup, allowing the finger elements 42 to take the form of a tube, such as rigid or flexible plastic tubing.

Referring now to FIG. 4B, according to another example, the first gas manifold 26a is shown to include a supporting spine 44a, and without finger elements. Apertures 50a are distributed across the spine 44a for delivering flows of carbon dioxide gas. A gas passage 52a in the spine 44a may run axially from one end to the opposite end, in fluid communication with each of the apertures 50a. The configuration of the spine 44a and the apertures 50a is also shown in FIG. 5B.

FIGS. 5C, 5D and 5E show additional exemplary configurations. In FIG. 5C, the aperture 50b is shown to be generally aligned with an axis of the finger element 42b, and has a different, smaller cross sectional area. Furthermore, apertures may additionally or alternatively be positioned not just on the outward end of the finger element, but on the sides of the finger elements, on sections that may be expected to be in contact with concrete. For example, in FIG. 5D, the aperture 50c is shown to be generally perpendicular to an axis of the finger element 42c. FIG. 5E shows apertures 50d that are arranged at an angle relative to an axis of the finger element 42d.

It should be appreciated that the configurations of the gas manifolds 26, 26a shown in FIGS. 4A and 4B, respectively, may also be implemented as the gas manifolds 34, 38, 40 described herein. In any case, the gas manifold is arranged so that the apertures are either in contact with the concrete to be treated, or otherwise in relatively close proximity.

Figure 6:
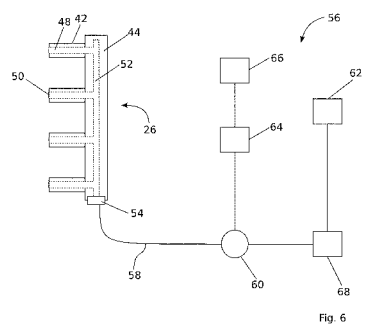
FIG. 6 is a schematic diagram of a gas delivery system.

Referring now to FIG. 6, a gas delivery system 56 is adapted to control distribution of carbon dioxide gas through at least one component of a molding machine, upstream of the product mold. In some examples, the gas delivery system 56 may be implemented as a retrofit to an existing molding machine, so that no parts of the molding machine may need to be changed or significantly modified. In these examples, the gas delivery system 56 may be provided as additional components to the molding machine, which once installed do not interfere with the motion of any moving parts of the molding machine.

The gas delivery system 56 is shown to include at least one of the gas manifolds 26, to provide carbon dioxide gas to the feedbox 16 (FIG. 2B). Additionally, or alternatively, the gas delivery system 56 may include at least one of the gas manifolds 34, 38, 40 to provide carbon dioxide gas to the feedbox 16 or the hopper 14 (FIGS. 2C, 3A and 3B).

The gas inlet fitting 54 of the gas manifold 26 is connected by a gas feed line or conduit 58 to at least one gas supply valve 60. The conduit 58 may be sufficiently flexible to allow for movement of the gas manifold 26 and normal agitation during the production cycle. On the other hand, the conduit 58 may be sufficiently rigid, or tied-off, or both, to ensure that it does not interfere with any moving part of the molding machine (identified by reference numeral 66). The gas supply valve 60 governs flow of pressurized gas between a pressurized gas supply 62 and the gas manifold 26. In some examples, the gas supply valve 60 may include several gate valves that permit the incorporation of calibration equipment, e.g., one or more mass flow meters.

When the gas supply valve 60 is open, pressurized carbon dioxide-rich gas flows from the gas supply 62 to the gas inlet fitting 54, through the gas passages 52, 48 and out through the apertures 50. The gas supply 62 may include, for example, a pressurized tank (not shown) filled with carbon dioxide-rich gas, and a pressure regulator (not shown). The tank may be re-filled when near empty, or kept filled by a compressor (not shown). The regulator may reduce the pressure in the tank to a maximum feed pressure. The maximum feed pressure may be above atmospheric, but below supercritical gas flow pressure. The feed pressure may be, for example, in a range from 120 to 875 kPa. A pressure relief valve (not shown) may be added to protect the carbon dioxide gas supply system components. The carbon dioxide gas supplied by the gas supply 62 may be at about room temperature. However, if not, a heater (not shown) may be added to bring the uncompressed gas up to roughly room temperature before flowing to the gas manifold 26.

The gas supply valve 60 may be controlled by a controller 64. The controller 64 may be, for example, an electronic circuit or a programmable logic controller. In general, the controller 64 manages gas flow through the gas supply valve 60. The controller 64 may be connected to the molding machine 66 such that the controller 64 may sense when the molding machine 66 has begun or stopped a stage of operation, and thereby synchronize delivery of the carbon dioxide gas with the production cycle of the molding machine 66. For example, the controller 64 may be wired into an electrical controller or circuit of the molding machine 66 such that during one or more stages of operation a voltage, current or another signal is provided to the controller 64. Alternatively or additionally, one or more sensors may be added to the molding machine 66, adapted to advise the controller 64 of conditions of the molding machine 66. When not retrofitted to an existing molding machine, functions of the controller 64 may be integrated into a control system of the molding machine. Further alternatively, the controller 64 may consider a timer, a temperature sensor, a mass flow, flow rate or pressure meter in the conduit 58, or other devices, in determining when to stop and start gas flow (e.g., a solenoid). In general, the controller 64 is adapted to open the gas supply valve 60 at a time beginning between when the concrete passes in the vicinity of the apertures 50, and close the gas supply valve 60 after a desired amount of carbon dioxide gas has been delivered over a desired period of time.

Mass of carbon dioxide gas sent to the gas manifold 26 may be controlled using a mass flow controller 68 that is arranged between the gas supply 62 and the gas supply valve 60. The mass flow controller 68 may communicate with the controller 64, once the gas supply 62 has delivered a suitable amount of gas to the gas manifold 26. The controller 64 may then close the gas supply valve 60, and thereby cease supply of the carbon dioxide gas through the gas manifold 26.

In some examples, the controller 64 may connect to a plurality of the gas manifolds 26, arranged to distribute the gas to various specific locations of the molding machine, including different portions of the feedbox and/or the hopper, as described herein. In such examples, the controller 64 may generally synchronize gas delivery at the various locations with the relevant steps of the given production cycle. The concrete may pass through the molding machine in a way in which some locations will be in contact with concrete sooner, or in greater quantities than other locations. Accordingly, the controller 64 may control distribution of the gas to the various locations at different times and different quantities.

The gas for treating the concrete may have a high concentration of carbon dioxide, and minimal concentrations of any gases or particulates that would be detrimental to the concrete curing process or to the properties of the cured concrete. The gas may be a commercially supplied high purity carbon dioxide. In this case, the commercial gas may be sourced from a supplier that processes spent flue gasses or other waste carbon dioxide so that sequestering the carbon dioxide in the gas sequesters carbon dioxide that would otherwise be a greenhouse gas emission.

Other gases that are not detrimental to the curing process or concrete product may be included in a treatment gas mixture. However, if the gas includes other gases besides carbon dioxide, then the required flow rate and pressure may be determined based on the carbon dioxide portion of the gas alone. The total flow rate and pressure may need to remain below a level that prevents the formation of bubbles or sprays concrete materials out of the feedbox, which may limit the allowable portion of non-carbon dioxide gases. In some cases, on site or nearby as-captured flue gas may be used to supply some or all of the gas containing carbon dioxide, although some particulate filtering or gas separation may be required or desirable.

Figure 7:
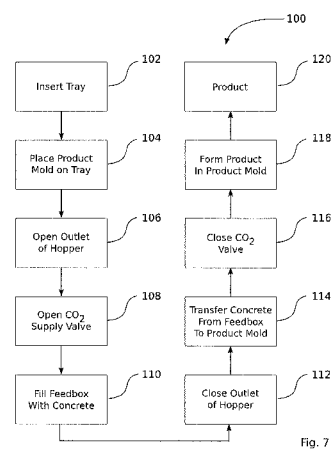
FIG. 7 is a flow chart of a method of manufacturing concrete products with carbon dioxide treatment.

In general, in accordance with the teachings of the present disclosure, carbon dioxide gas is delivered by a gas delivery system to a supply of concrete upstream from molding. Referring now to FIG. 7, a method 100 begins by inserting a tray into a molding machine in step 102. In step 104, a product mold is placed on the tray. In step 106, an outlet of a hopper is opened to deliver fresh concrete to a feedbox. In step 108, which may be concurrent with step 106, a gas supply valve of the gas delivery system is opened to start delivering carbon dioxide gas into the feedbox. In step 110, the feedbox has been filled with the appropriate amount of concrete. In step 112, the hopper stops providing concrete to the feedbox. In step 114, the concrete in the feedbox is delivered into the product mold. In step 116, the gas valve of the gas delivery system is closed to cease delivery of gas to the feedbox. In step 118, the treated concrete in the product mold is compacted and consolidated. In step 120, the product mold is stripped by raising the product mold and then the compaction arm. Thereafter the tray with at least one molded concrete product is removed for further processing, such as further curing, if any, packaging and distribution. The stripped products may continue to a steam or heat curing process; however, the time or temperature of the curing required to produce a desired strength may be reduced. For example, the concrete products may be cured at a temperature between 35 and 70° C. and relative humidity of about 75% or more. Optionally, flue gas from the steam or heat curing may be recaptured and injected into other blocks.

The exact order of the steps 104, 106, 108, 110, 112, 114, 116, 118 and 120 may be varied, but, in some examples, carbon dioxide may be directed at the concrete at least during step 114 while the concrete is in the feedbox (or hopper). The inventors believe that aligning the delivery of the carbon dioxide gas with the movement of the concrete as it passes through the feedbox (or hopper) may facilitate an even distribution and mixing of the carbon dioxide within the concrete. With a relatively rapid delivery, for example, delivering carbon dioxide gas for 10 seconds or less, the treatment method may only minimally slow the molding operation, if at all. This rapid delivery may serve to distribute the carbon dioxide throughout the concrete mix before the product formation to maximize the exposure of the concrete mix to carbon dioxide, and the calcium carbonate forming reactions may not inhibit the subsequent compaction and formation of the concrete products.

If the delivered gas contains essentially only carbon dioxide or other non-polluting gases or particulates not detrimental to health, then any excess gas not absorbed by the concrete may be allowed to enter the atmosphere. Provided that the total amount of carbon dioxide per cycle does not exceed the maximum possible carbon uptake, very little carbon dioxide will be emitted. However, particularly if un-separated flue gas is used to supply the carbon dioxide, other gasses may be emitted. Gases leaving the mold may be collected by a suction pressure ventilation system, such as a fume hood or chamber, for health and safety or pollution abatement considerations.

In accordance with the teachings of the present disclosure, concrete samples were produced in a lab and subjected to bench scale carbonation as part of their formation.

The standard concrete was analogous to a conventional concrete block mix design. It contained 1.494 kg of cement, the equivalent of 12.65 kg of saturated surface dry fine aggregate (Milford sand) and the equivalent of 5.90 kg of saturated surface dry fine aggregate (Folly Lake ⅜" stone). 2.6 ml of a superplasticizer was used. Water was added to the mix to achieve a dry mix concrete with a water to cement ratio of about 0.74. The batch size of 20 kg was sufficient to create 5 standard concrete cylinders with dimensions of 100 mm diameter and 200 mm height.

The concrete was mixed for two minutes in a Hobart 30 quart mixer. The concrete was portioned into 3.75 kg charges. The charges of concrete were emptied into a cylinder mold subjected to vibration on a vibrating table. A pneumatic ram was used to finish the production by pushing the material into the mold with a force of 800 lbs. The compaction occurred in conjunction with the vibration, as per dry cast production of a concrete block.

Samples were demolded at 24 hours and submerged in a room temperature bath of water saturated with hydrated lime until the time of compression testing.

Carbonated samples were produced with a slightly wetter concrete mix with a water to cement ratio of about 0.77. It was observed that the carbonation treatment may promote a slight reduction in the effective water content of a sample. As compensation, slightly more water was added to the mix for carbonated concrete.

The carbon dioxide gas was introduced through a ring secured to the top of the mold. When the concrete charge was emptied into the mold the concrete would pass through the ring. The ring had hollow walls with a row of apertures regularly spaced on the inner surface. A gas connection allow for a gas stream to be injected into the ring and flow through the apertures to the interior space of the ring. The concrete would pass through the carbon dioxide stream immediately prior to coming to rest in the mold. The gas delivery was manually controlled to be aligned with the emptying of the concrete charge into the mold. The typical time of carbon dioxide delivery was 6 to 8 seconds. The gas was a conventional, unblended, substantially pure carbon dioxide, readily available from an industrial gas supplier in compressed cylinders.

Table 1 shows the results of 7 day compressive strength testing on control specimens. The set of 15 specimens consisted of 3 batches of 5 specimens. The column labeled "Sample" gives an arbitrary number to each of the 15 specimens. The first batch is samples 1 to 5, the second batch is samples 6 to 10 and the third batch is samples 11 to 15. The concretes were oven dried to check the moisture. A fresh sample of each batch was immediately placed into an oven at 120° C. and held until the mass constant. The difference in the initial sample mass and final sample mass was adjusted to compensate for the absorption of the aggregates and expressed as a percentage of the dry mass. The three control batches had water contents of 4.99%, 6.38% and 5.37%. The collected data has a mean of 9.44 MPa and a standard deviation of 1.23 MPa.

TABLE 1

7 day strength of dry mix control concrete produced in a lab.

| Sample | Compressive Strength (MPa) |
|---|---|
| 1 | 11.75 |
| 2 | 10.65 |
| 3 | 10.34 |
| 4 | 9.56 |
| 5 | 11.75 |
| 6 | 8.68 |
| 7 | 9.38 |
| 8 | 8.04 |
| 9 | 9.76 |
| 10 | 8.19 |
| 11 | 8.51 |
| 12 | 8.08 |
| 13 | 9.12 |
| 14 | 9.49 |
| 15 | 8.33 |

Table 2 shows the results of 7 day compressive strength testing on carbonated specimens. The carbonated samples were subject to a 2.9 LPM flow of carbon dioxide gas as the material was placed into the mold. The set of 15 specimens consisted of 3 batches of 5 specimens. The column labeled "Sample" gives an arbitrary number to each of the 15 specimens. The first batch is samples 1 to 5, the second batch is samples 6 to 10 and the third batch is samples 11 to 15. The concretes were oven dried to check the moisture. A fresh sample of each batch was immediately placed into an oven at 120° C. and held until the mass constant. The difference in the initial sample mass and final sample mass was adjusted to compensate for the absorption of the aggregates and expressed as a percentage of the dry mass. The three control batches had water contents of 6.25%, 6.23% and 6.17%. The collected data has a mean of 10.95 MPa and a standard deviation of 1.35 MPa.

TABLE 2

7 day strength of carbonated dry mix concrete produced in a lab.

| Sample | Compressive Strength (MPa) |
|---|---|
| 1 | 10.47 |
| 2 | 9.64 |
| 3 | 10.90 |
| 4 | 10.22 |
| 5 | 8.55 |
| 6 | 10.98 |
| 7 | 10.07 |
| 8 | 11.37 |
| 9 | 10.64 |
| 10 | 13.00 |
| 11 | 14.04 |
| 12 | 11.27 |
| 13 | 11.04 |
| 14 | 9.93 |
| 15 | 12.07 |

Strength was not found to be a function of water content in the range of water contents observed and in regards to the mix design and production technique used. Thus, the results suggest that the carbonation treatment improved the strength of the concrete. Statistical analysis of an independent two-sample t-test, using equal sample sizes, and assuming equal underlying variance suggests that the carbonated concrete is conclusively stronger than the control concrete with a 95% confidence (according to a calculated test statistic of 3.187 compared to the critical minimum test statistic at 95% confidence and 28 degrees of freedom of 2.00).

While the above description provides examples of one or more apparatuses or methods, it will be appreciated that other apparatuses or methods may be within the scope of the accompanying claims.

We claim:

1. A method of retrofitting an existing apparatus for forming concrete products, wherein the apparatus comprises a component located upstream of a product mold and adapted to deliver concrete to the product mold, comprising adapting the component to treat fresh concrete to be delivered to the product mold by the component with carbon dioxide gas to form treated concrete, wherein the step of adapting comprises adding to the existing component a gas delivery system that is configured to direct the carbon dioxide gas onto a surface of the fresh concrete or at a stream of the fresh concrete, or any combination thereof, and wherein the gas delivery system is provided with one or more gas manifolds comprising a plurality of apertures, wherein the apertures are positioned to be in close proximity to the concrete but not in contact with the concrete, thereby retrofitting the existing apparatus into a retrofitted apparatus.

2. The method of claim 1, wherein the component comprises a hopper, a feedbox, or a combination thereof.

3. The method of claim 1, wherein the product mold is adapted to form a product selected from the group consisting of blocks, pavers, decorative masonry units, tiles, and pipes.

4. The method of claim 1, wherein, in the step of adapting, the one or more gas manifolds comprising a plurality of apertures are mounted to an inner surface of a peripheral wall of the component, mounted to an outer surface of a peripheral wall of the component, formed as part of a subcomponent of the component or a combination thereof.

5. The method of claim 2, wherein the retrofitting further comprises adding to the existing apparatus one or more sensors and a controller for synchronizing the delivery of the carbon dioxide gas with an action of the component, an action of a subcomponent of the component, a step of a production cycle, or any combination thereof.

6. The method of claim 5, wherein the controller is in electronic communication with a control circuit of the existing apparatus and/or one or more sensors or devices added to the existing apparatus, and wherein the controller is further in communication with one or more gas manifolds for supplying the carbon dioxide gas to the fresh concrete.

7. The method of claim 5, wherein the sensors and the controller are adapted to align the timing of delivery of carbon dioxide gas with movement of the fresh concrete as it passes through the feedbox and/or the hopper.

8. The method of claim 5, wherein the controller is adapted to open a gas supply valve for supplying the carbon dioxide gas when the fresh concrete passes in the vicinity of an aperture of a gas manifold comprising a plurality of apertures for delivering the carbon dioxide gas onto the surface and/or at the stream of the fresh concrete, and close after a desired amount of the carbon dioxide gas has been delivered over a desired amount of time.

9. The method of claim 8, wherein the desired amount of time is 60 seconds or less.

10. The method of claim 4, wherein the diameter of the apertures is between 1 mm and 10 mm.

11. The method of claim 4 claim 1 wherein the component is a feedbox.

12. The method of claim 4 wherein the component is a hopper.

13. The method of claim 1, wherein the gas delivery system comprises a carbon dioxide feed tank and a pressure regulator.

14. The method of claim 13, wherein the pressure regulator maintains a maximum feed pressure for the carbon dioxide gas above atmospheric pressure but below supercritical pressure.

15. The method of claim 14, wherein the pressure regulator maintains a feed pressure in the range from 120 kPa to 875 kPa.

* * * * *